(12) United States Patent
Dowden et al.

(10) Patent No.: US 9,598,580 B2
(45) Date of Patent: Mar. 21, 2017

(54) POLYMERS, COMPOSITES, AND METHODS FOR MAKING POLYMERS AND COMPOSITES

(71) Applicant: Hexion Inc., Columbus, OH (US)

(72) Inventors: Adam Daniel Dowden, Huntington, TX (US); Harden Christopher Wren, Lufkin, TX (US); Todd Ross Miller, Eugene, OR (US)

(73) Assignee: HEXION INC., Columbus, OH (US)

( * ) Notice: Subject to any disclaimer, the term of this patent is extended or adjusted under 35 U.S.C. 154(b) by 72 days.

(21) Appl. No.: 14/642,285

(22) Filed: Mar. 9, 2015

(65) Prior Publication Data

US 2015/0259534 A1 Sep. 17, 2015

Related U.S. Application Data

(60) Provisional application No. 61/951,980, filed on Mar. 12, 2014.

(51) Int. Cl.
| | |
|---|---|
| *C08G 14/04* | (2006.01) |
| *C08L 97/00* | (2006.01) |
| *C08G 16/02* | (2006.01) |
| *D21H 17/58* | (2006.01) |
| *C08H 7/00* | (2011.01) |
| *C08L 61/00* | (2006.01) |

(52) U.S. Cl.
CPC ........ *C08L 97/005* (2013.01); *C08G 16/0237* (2013.01); *C08H 6/00* (2013.01); *C08L 61/00* (2013.01); *D21H 17/58* (2013.01)

(58) Field of Classification Search
CPC .................................................. C08G 16/0237
See application file for complete search history.

(56) References Cited

U.S. PATENT DOCUMENTS

| | | | |
|---|---|---|---|
| 4,219,082 A | 8/1980 | Kalfoglou | |
| 5,202,403 A * | 4/1993 | Doering | C08G 8/38 525/54.42 |
| 6,716,729 B2 | 4/2004 | Arbuckle et al. | |
| 8,044,248 B2 | 10/2011 | Palmer | |
| 2003/0094594 A1 * | 5/2003 | Arbuckle | C07C 39/16 252/182.25 |
| 2013/0287993 A1 | 10/2013 | Williamson et al. | |
| 2014/0017612 A1 | 1/2014 | Reddy et al. | |

* cited by examiner

*Primary Examiner* — Michael Pepitone

(57) ABSTRACT

Polymeric materials and methods for making the polymeric materials utilizing bisphenolic stillbottoms, lignosulfonates, or both are disclosed. In one embodiment, a polymer is provided that includes a condensate of bisphenolic stillbottoms, an optional phenolic compound independent of bisphenolic stillbottoms, an aldehyde, and a lignosulfonate compound. The condensate may further include an amino compound, a catalyst, or combinations thereof. Alternatively, the polymer may be free of a phenolic compound independent of bisphenolic stillbottoms. The polymers may be used in the manufacture of articles including composites, laminates and paper products.

16 Claims, No Drawings

US 9,598,580 B2

POLYMERS, COMPOSITES, AND METHODS FOR MAKING POLYMERS AND COMPOSITES

RELATED APPLICATION DATA

This application claims benefit to U.S. Provisional Application No. 61/951,980 filed Mar. 12, 2014, of which the entire contents of the application are incorporated by reference herein.

FIELD OF THE INVENTION

This invention relates to a method of manufacturing novel polymers. This invention further relates to hydroxyaromatic-aldehyde compositions that are useful in the manufacture of composites, laminates, and paper products.

BACKGROUND OF THE INVENTION

Hydroxyaromatic-aldehyde polymers, and in particular phenol-formaldehyde resole polymers, are of utility in a wide range of applications due to their excellent physical properties, including their durability, water resistance, bond strength, and the like, as well as their low cost and ease of manufacture and use. Phenol-formaldehyde resole polymers have accordingly been used in the manufacture of products as diverse as laminates, consolidated wood products, and fiberglass insulation materials.

While a wide variety of hydroxyaromatic-aldehyde polymers have been developed and are suitable for their intended purposes, environmental and industry standards demand ever-increasing improvement in both environmental compliance and physical properties of the polymers. Reduction in aldehyde (particularly formaldehyde) emissions has proved particularly difficult without significantly adversely affecting the advantageous properties of the polymers, cost, and/or manufacturing time. For example, formaldehyde scavengers such as urea, ammonia, melamine, various primary and secondary amines, dicyandiamide, and other amino-based modifications have been added to resoles. These are typically post-added to the polymer or at the customers' plant, resulting in low efficiencies. Post-addition of urea can cause trimethylamine odors, which arise from incomplete reaction of urea. Post-addition of ammonia as a scavenger can lead to lower water dilutability, unwanted precure, and ammonia odor.

Additionally, increasing costs for raw materials, such as phenol, and a global push to seek out environmentally friendly chemistries have led to the search for alternatives to remain competitive in the market.

Further, production processes for phenolic compounds often produce by-product material with limited uses. For example, bisphenolic production processes often have by-products called "stillbottoms" that have limited commercial and industrial use or are difficult to process into useful materials. For example, bisphenolic stillbottoms must be further refined before they are useable in the synthesis of a novolac polymer, which refining process may include extreme temperatures, reduced pressures and in the presence of an alkaline catalyst, to recover useful materials.

There is accordingly a need for hydroxyaromatic-aldehyde polymers and methods that will lower or remove hydroxyaromatic and aldehyde (particularly formaldehyde) emissions from hydroxyaromatic-aldehyde while maintaining or improving advantageous physical properties, such as moisture resistance, that can be used in the preparation of useful articles.

SUMMARY OF THE INVENTION

Embodiments of the invention are directed to hydroxyaromatic-aldehyde polymer compositions, composites, and methods for making composition and composites.

In one aspect, a polymer is provided that includes a condensate of an aldehyde, bisphenolic stillbottoms, and a lignosulfonate compound. The condensate may further include an amino compound, a catalyst, or combinations thereof. The condensate may be free of phenolic compound independent of bisphenolic stillbottoms.

In another aspect, a polymer is provided that includes a condensate of bisphenolic stillbottoms, a phenolic compound independent of bisphenolic stillbottoms, an aldehyde, and a lignosulfonate compound. The condensate may further include an amino compound, a catalyst, or combinations thereof.

In another aspect, a polymer is provided that includes a first condensate of a first aldehyde, bisphenolic stillbottoms, and optionally, a first phenolic compound independent of bisphenolic stillbottoms; and a second condensate of a second aldehyde a second phenolic compound independent of bisphenolic stillbottoms, and a lignosulfonate compound. The first condensate, the second condensate, or both may each further include an amino compound, a catalyst, or combinations thereof.

In another aspect, a method is provided that includes mixing and reacting an aldehyde, and a lignosulfonate compound to produce a reaction product, determining a water tolerance of the reaction product, adding a bisphenolic stillbottoms to the reaction product, and mixing and reacting the reaction product and the bisphenolic stillbottoms. The method may further include adding an amino compound, a catalyst, or combinations thereof.

In another aspect, a method is provided that includes mixing and reacting a phenolic compound independent of bisphenolic stillbottoms, an aldehyde, and a lignosulfonate compound to produce a reaction product, determining a water tolerance of the reaction product, adding a bisphenolic stillbottoms to the reaction product, and mixing and reacting the reaction product and the bisphenolic stillbottoms. The method may further include adding an amino compound, a catalyst, or combinations thereof.

In another aspect, a method is provided that includes mixing and reacting a first phenolic compound independent of bisphenolic stillbottoms and a first aldehyde to produce a first reaction product, determining a water tolerance of the reaction product, adding a bisphenolic stillbottoms to the reaction product, and mixing and reacting the first reaction product and the bisphenolic stillbottoms; reacting a second phenolic compound independent of bisphenolic stillbottoms, a second aldehyde, and a lignosulfonate compound to produce a second reaction product; and mixing and reacting the first reaction product and the second reaction product. The method may further include adding an amino compound, a catalyst, or combinations thereof to the first reaction product, the second reaction product, or both.

In another aspect, a method is provided that includes mixing and reacting a phenolic compound independent of bisphenolic stillbottoms, an aldehyde, a lignosulfonate compound, bisphenolic stillbottoms and a catalyst to produce a reaction product. The method may further include adding an amino compound. The catalyst may be a resole or novolac catalyst.

In another aspect, a method is provided that includes mixing and reacting an aldehyde, a lignosulfonate compound, bisphenolic stillbottoms and a catalyst to produce a reaction product. The method may further include adding an amino compound. The catalyst may be a resole or novolac catalyst. The method may be performed free of a phenolic compound independent of bisphenolic stillbottoms.

In another aspect, a polymer is provided that includes the product of mixing and reacting a reaction product of a phenolic compound independent of bisphenolic stillbottoms, an aldehyde, a lignosulfonate compound, and a catalyst, the reaction product having a water tolerance of from about 400% to about 1100%, and a bisphenolic stillbottoms. The reaction product may further include an amino compound. The catalyst may be a resole or novolac catalyst.

In another aspect, a polymer is provided that includes the product of mixing and reacting a reaction of an aldehyde, a lignosulfonate compound, a catalyst, and bisphenolic stillbottoms. The reaction product may further include an amino compound. The catalyst may be a resole or novolac catalyst. The polymer may be free of phenolic compound independent of bisphenolic stillbottoms.

In another aspect, a polymer is provided that includes a first reaction product comprising mixing and reacting a first aldehyde, a catalyst, bisphenolic stillbottoms, and, optionally, a first phenolic compound independent of bisphenolic stillbottoms; and a second product comprising mixing and reacting a second phenolic compound independent of bisphenolic stillbottoms, a second aldehyde, a lignosulfonate compound, and a catalyst. The reaction product may further include an amino compound. The catalysts may each be a resole or novolac catalyst.

In another aspect, a polymer impregnated product is provided that includes a substrate, an effective amount of the polymer made with a lignosulfonate and bisphenolic stillbottoms, wherein the substrate is impregnated with the polymer.

DETAILED DESCRIPTION OF THE INVENTION

The present invention provides polymers made from a condensate comprising at least an aldehyde and bisphenolic stillbottoms. The condensate may further include a lignosulfonate compound. The bisphenolic stillbottoms may be a single-phase composition. The condensate may include a phenolic compound independent from the bisphenolic stillbottoms, or the condensate may be free of phenolic compound independent from the bisphenolic stillbottoms. The condensates and/or polymers may further include catalysts, amino compounds, solvents, or combinations thereof. In addition, the polymers may be used in the manufacture of additional products, such as composites, laminates and paper products.

The phrase "phenolic compound independent from the bisphenolic stillbottoms" is defined herein as a phenolic compound in addition to (separate from) the phenolic compounds forming the bisphenolic stillbottoms. The phenolic compound independent from the bisphenolic stillbottoms may include a compound found in the bisphenolic stillbottoms, for example, the phenolic compound independent from the bisphenolic stillbottoms may be phenol, and phenol may be found in the bisphenolic stillbottoms.

In one aspect, a polymer is provided that includes a condensate of an aldehyde, bisphenolic stillbottoms, and a lignosulfonate compound. The polymer may be free of a phenolic compound independent of bisphenolic stillbottoms. The condensate may further include an amino compound, a catalyst, or combinations thereof.

In another aspect, a polymer is provided that includes a condensate of a phenolic compound independent of bisphenolic stillbottoms, an aldehyde, bisphenolic stillbottoms, and a lignosulfonate compound. The condensate may further include an amino compound, a catalyst, or combinations thereof.

In another aspect, a polymer is provided that includes a first condensate of a first aldehyde, bisphenolic stillbottoms, and optionally, a first phenolic compound independent of bisphenolic stillbottoms; and a second condensate of a second aldehyde a second phenolic compound independent of bisphenolic stillbottoms, and a lignosulfonate compound. The first condensate, the second condensate, or both may each further include an amino compound, a catalyst, or combinations thereof. For the embodiments disclosed herein, the bisphenolic stillbottoms may comprise a single-phase composition of bisphenolic stillbottoms. The first condensate, the second condensate, or both, may each further include an amino compound, a catalyst, or combinations thereof.

The aldehyde used in the polymer synthesis may include compounds having one to 40 carbon atoms (C1 to C40) with one or more aldehyde groups, such as monoaldehydes, dialdehydes, and combinations thereof. Suitable examples of monoaldehydes include, and are not limited to, compounds selected from the group consisting of formaldehyde, acetaldehyde, propionaldehyde, n-butyraldehyde, isobutyraldehyde, benzaldehyde, glyoxal, furfural, and combinations thereof. Suitable examples of dialdehydes include, and are not limited to, compounds selected from the group consisting of glyoxal, glutaraldehyde, and combinations thereof. The aldehyde may be present in an amount from about 10 wt. % to about 80 wt. %, such as from about 20 wt. % to about 40 wt. %, of the composition to be subjected to the condensate reaction.

Bisphenolic stillbottoms are produced by condensing phenolic compounds, such as phenol, and ketones in the presence of a strong acid catalyst. Bisphenol A stillbottoms, as one example of bisphenolic stillbottoms known in the art, are produced by condensing phenol and acetone in the presence of a strong acid catalyst. When the bisphenol is separated from the reaction mixture by distillation, for example, or by other purification methods, there is a material remaining that has been described in the art as bisphenolic stillbottoms. Consistent with the use of the term in the art, hereinafter, the term bisphenolic stillbottoms refers to that material separated during the preparation of bisphenol that is not purified bisphenol. Thus, bisphenolic stillbottoms may contain some bisphenol. Bisphenol A stillbottoms typically contain, in predominant proportions, other phenol-acetone reaction products. Dihydroxydiphenylpropane isomers and chromane compounds are typically present in lesser amounts. Bisphenolic stillbottoms are further described in U.S. Pat. No. 6,716,729, which is incorporated herein by reference to the extent not inconsistent with the description herein. The bisphenolic stillbottoms may be present in an amount from about 1 wt. % to about 99 wt. %, such as from about 5 wt. % to about 70 wt. %, of the composition to be subjected to the condensate reaction.

According to one embodiment of the bisphenolic stillbottoms, the bisphenolic stillbottoms comprise a single-phase composition of bisphenolic stillbottoms. In one embodiment of the present invention, the single-phase composition of bisphenolic stillbottoms may be prepared by mixing water and bisphenolic stillbottoms together under controlled conditions. Surprisingly, it has been determined that when water is mixed with molten bisphenolic stillbottoms, under reflux conditions a stable composition results. Such a composition is a single-phase solution at temperatures as low as 75° C., and a single-phase composition that is a semi-solid ranging from a wax-like to a tar-like consistency at room temperature. The single-phase semi-solid can then be reheated to form a single phase liquid.

The preparation of commercial bisphenolic stillbottoms typically involves a distillation step whereby a purified bisphenolic stillbottoms is recovered and a residual bisphenolic stillbottoms is separated from the recovered product. The bisphenolic stillbottoms may also be described as a distillation residue. As is known in the art, the bisphenolic stillbottoms exhibits different chemical properties, including reactivity, as compared to the remainder of the feedstock representing the purified products. Bisphenolic stillbottoms useful in the process of the present invention may include bisphenol stillbottoms derived from a bisphenol A process, derived from a bisphenol F process, and combinations thereof. It is generally known in the art that bisphenol A has a purity of at least 98%, on a weight basis and that bisphenol A stillbottoms are of a lesser purity. As noted above, it is also known in the art that bisphenolic stillbottoms exhibit different chemical properties, including reactivity, than bisphenol A, for example.

Bisphenol A stillbottoms have been assigned a CAS Registry number of CAS 72162-28-8 as a distinct chemical substance. The CAS REGISTRY, a division of the American Chemical Society, is the most authoritative collection of disclosed chemical substance information, containing more than 75 million organic and inorganic substances and 64 million sequences and is used commonly in the chemical industry, such as by Sigma-Aldrich, Inc., to classify over 200,000 chemicals. The CAS REGISTRY covers substances identified from the scientific literature from 1957 to the present, with additional substances going back to the early 1900s.

Bisphenol A stillbottoms are commercially available. One source for such stillbottoms is General Electric Company, Plastics Group, Schenectady, N.Y., under the trade name V-390 PHENOLIC EXTENDER ("V-390"). V-390 is a mixture of products produced during the manufacture of bisphenol A. V-390 is also known under the synonyms and trade name: BPA tar, BPA isomers, and LE 390 PHENOLIC EXTENDER. V-390 has a melting point range of from about 62° C. to about 110° C. (about 144° F. to about 230° F.).

An alternate source for Bisphenol A stillbottoms is Aristech Chemical Corporation, Pittsburgh, Pa. under the product name BPA HEAVIES. BPA HEAVIES is a mixture of Bisphenol A, o,p-Bisphenol A isomers, and phenol. BPA HEAVIES is also known under the synonyms: 4,4'-Isopropylidenediphenol, and Bisphenol A bottoms. BPA HEAVIES begin to melt at about 62° C. (about 144° F.).

Table 1 describes one embodiment of a bisphenolic A stillbottoms composition.

TABLE 1

| Component | Concentration |
| --- | --- |
| p,p-Bisphenol A | 10%-84% |
| o,p-Bisphenol A | 0%-30% |

TABLE 1-continued

| Component | Concentration |
| --- | --- |
| Trisphenol | 10%-25% |
| Chroman-I (p-(2,2,4-trimethyl- 4-chromanyl)phenol) | 0%-3% |
| Phenol | 0%-25% |
| Other Phenol-Acetone Reaction Products | 45%-75% |

The percentages listed in Table 1 are on a weight-per-weight (w/w) basis calculated on the total weight of the bisphenolic stillbottoms. It is understood that the component amounts will add up to 100 percent. It should also be evident from the data of Table 1, that the bisphenolic stillbottoms of the present invention may contain substantially non-bisphenol A components.

In contrast to the bisphenolic stillbottoms of the present invention, bisphenol A melts at 150-155° C. Thus, it can be seen that the composition of bisphenolic stillbottoms, as used herein, is significantly different from the purified bisphenol product from which the bisphenolic stillbottoms is separated. Bisphenolic stillbottoms and single-phase compositions of bisphenolic stillbottoms are disclose in co-owned U.S. Pat. No. 6,716,729, which is incorporated by reference herein to the extent not inconsistent with the description herein.

In one embodiment of the bisphenolic stillbottoms comprise stable aqueous solutions of bisphenolic stillbottoms. In one embodiment of the process to form stable aqueous solutions of bisphenolic stillbottoms, the bisphenolic stillbottoms are first brought to a molten state in a vessel to which heat may be applied. Once the bisphenolic stillbottoms are in a molten state, water is then added to the vessel containing the molten bisphenolic stillbottoms. The weight of water added to the vessel is from about 1% to about 20% based on the combined weight of water and bisphenolic stillbottoms. Because the temperature of the molten bisphenolic stillbottoms may be near or above 100° C., the atmospheric boiling point of water, it is preferred that the vessel containing the molten stillbottoms be so equipped to reflux the water vapor that may evolve from the vessel. The water and the molten bisphenolic stillbottoms are then mixed, for about 30 minutes to about 120 minutes, until a single-phase solution is formed.

In a preferred embodiment, the bisphenolic stillbottoms are heated to about 110° C. and water is slowly added, under mixing, over about 15 to 30 minutes. The temperature of the resulting solution is allowed to drop to about 80 to 90° C.

The lignosulfonate compound includes materials selected from condensates of lignosulfonate, salts of lignosulfonate, and combinations thereof. Suitable examples of lignosulfonates include compounds selected from the group consisting of lignosulfonic acid sodium salt, lignosulfonic acid ammonium salt, lignosulfonic acid potassium salt, lignosulfonic acid calcium salt, and combinations thereof. Lignosulfonic acid salts have been assigned a CAS Registry number of CAS 68131-31-7 and 8061-51-6. Lignosulfonic acid sodium salt is commercially available as POLYFON™ H surfactant from MeadWestvaco Corporation of Richmond, Va. The lignosulfonate material may be present in an amount from about 1 wt. % to about 99 wt. %, such as from about 5 wt. % to about 70 wt. %, of the composition to be subjected to the condensate reaction.

The polymer synthesis process and condensate may optionally include a phenolic compound independent of bisphenolic stillbottoms (separate from any phenol compounds in the bisphenolic stillbottoms). The phenolic compound independent of bisphenolic stillbottoms may comprise phenol cresol, xylenols, alkyl substituted phenols, bisphenol A, bisphenol F, and combinations thereof. The phenolic compound independent of bisphenolic stillbottoms composition may be provided in a dilute composition or with impurities. For example, phenolic compound independent of bisphenolic stillbottoms may comprise a composition of at least 90% phenol or at least 99% phenol, with the remainder being impurities or a solvent, such as a water, an organic solvent, and combinations thereof.

The phenolic compound independent of bisphenolic stillbottoms may be present in an amount from about 1 wt. % to about 99 wt. %, such as from about 5 wt. % to about 70 wt. %, of the composition to be subjected to the condensate reaction. Alternatively, the polymer synthesis process and condensate may be free of phenolic compounds independent of bisphenolic stillbottoms.

The polymer synthesis process may optionally include a catalyst. Suitable catalysts include, and are not limited to, compounds selected from the group of sodium hydroxide, sodium carbonate, alkaline earth oxides and hydroxides, ammonia hexamethylenetetranine ("HMTA"), tertiary amines, and combinations thereof. Other suitable catalysts include, and are not limited to, strong mineral acids such as sulfuric acid, phosphoric acid and hydrochloric acid as well as organic acid catalysts such as oxalic acid, para toluenesulfonic acid, and inorganic salts such as zinc acetate, or zinc borate. The catalyst may be present in an amount from about 1 wt. % to about 20 wt. %, such as from about 3 wt. % to about 10 wt. %, of the composition to be subjected to the condensate reaction.

The polymer synthesis may optionally include an amino compound, such as amines and amides. Suitable amino compounds include, and are not limited to, compounds selected from the group of urea, ammonium hydroxide, guanidine, and combinations thereof. The amino compound may be present in an amount from about 1 wt. % to about 40 wt. %, such as from about 5 wt. % to about 20 wt. %, of the composition to be subjected to the condensate reaction.

The polymer synthesis may include a solvent. The solvent may be selected from the group consisting of water, an organic solvent, and combinations thereof. Suitable examples of organic solvents include acetone, methylethylketone, isopropyl alcohol, toluene, and combinations thereof. The solvent may be present in an amount from about 10 wt. % to about 80 wt. %, such as from about 30 wt. % to about 60 wt. %, of the composition to be subjected to the condensate reaction.

In yet another embodiment of the invention, lignosulfonate and bisphenolic stillbottoms, alone or in combination, may be used to produce polymers, such as resole and novolac phenolic polymers useful in the making of composites, laminates and polymer impregnated papers. Conventional resole and novolac preparation is further described below and in *Phenolic Polymers, Chemistry, Applications and Performance*. (A. Knop and L. A. Pilato, Springer-Verlag (1985)).

The formation of a resole occurs under generally known conditions. The reaction is carried out at a molar ratio of phenolic compound to aldehyde of 1:0.2 to about 1:5. Catalysts typically employed include sodium hydroxide, sodium carbonate, alkaline earth oxides and hydroxides, ammonia hexamethylenetetranine ("HMTA"), tertiary amines, and combinations thereof. Resoles may also form under neutral to mildly acidic conditions. Divalent metal salts, for example, will catalyze resole formation.

A typical process for resole polymer synthesis is described as follows. Reactants are introduced into a reactor. The reactor is fitted with means to mix (stir) the contents, means to monitor the temperature of the reactor contents, and optionally, means to reflux volatile components and products. The bisphenolic stillbottoms, such as a stable aqueous solution of the bisphenolic stillbottoms, may be added at any point during the synthesis. It is well known in the art that the weights of reactants are adjusted at the time of addition to account for differences between the nominal assay and the precise assay of the reactant. The reactor contents are heated so that specific temperatures may be reached and maintained. Other arrangements will be known to those skilled in the art. A preferred reactor vessel provides means for mixing reactants, means for measuring and controlling the temperature of the reactants, means for refluxing any volatile compounds in the reactor vessel, and means for distilling off the volatile compounds.

The process for making resoles described above presents the basic aspects of such a process. It is understood by those of skill in the art that modifications to such a process may be made and at that various additives, in addition to the basic components described above, may be used. For the examples provided below, aldehyde is added in what is termed in the art as a programmed addition. In such an addition, aldehyde is metered into a reactor or reactor vessel over a period of time so that a maximum temperature is not exceeded. Those of skill in the art will recognize, however, that whether the aldehyde is added in a single add or is added in a programmed addition will not affect the final polymer product.

It has also been discovered that, surprisingly, water tolerance is one means to determine when the bisphenolic stillbottoms are to be added to a partially reacted resole, in order to produce polymers that exhibit preferred properties.

Novolac polymers are obtained by the reaction of a phenolic compound, such as phenol, and an aldehyde in an acidic pH region. Suitable acid catalysts include the strong mineral acids such as sulfric acid, phosphoric acid and hydrochloric acid as well as organic acid catalysts such as oxalic acid, para toluenesulfonic acid, and inorganic salts such as zinc acetate, or zinc borate, and combinations thereof. The phenol may be phenol itself but a portion of the phenol can be substituted with cresol, xylenols, alkyl substituted phenols such as ethylphenol, propylphenol, and mixtures thereof. The aldehyde may be formaldehyde but other aldehydes such as acetaldehyde, benzaldehyde, and furfural can also be used to partially or totally replace the formaldehyde. The lignosulfonate material may be sodium sulfonate.

The reaction of the aldehyde and phenolic compound is carried out at a molar ratio of 1 mole of the phenolic compound to about 0.40 to 0.85 mole of the aldehyde. For practical purposes, phenolic novolacs do not harden upon heating but remain soluble and fusible unless a hardener (curing agent) is present.

A typical process for novolac polymer synthesis is described as follows. Reactants are introduced into a reactor. The reactor is fitted with means to mix (stir) the contents, means to monitor the temperature of the reactor contents, and optionally, means to reflux volatile components and products. The bisphenolic stillbottoms, such as a stable aqueous solution of the bisphenolic stillbottoms, may be added at any point during the synthesis. It is well known in the art that the weights of reactants are adjusted at the time of addition to account for differences between the nominal assay and the precise assay of the reactant. The reactor contents are heated so that specific temperatures may be reached and maintained. Other arrangements will be known to those skilled in the art. A preferred reactor vessel provides means for mixing reactants, means for measuring and controlling the temperature of the reactants, means for refluxing any volatile compounds in the reactor vessel, and means for distilling off the volatile compounds.

The process for making novolacs described above presents the basic aspects of such a process. It is understood by those of skill in the art that modifications to such a process may be made and that various additives, in addition to the basic components described above, may be used. For the examples provided below, an aldehyde, such as formaldehyde, is added in what is termed in the art as a programmed addition. In such an addition, the aldehyde is metered into a reactor or reactor vessel over a period of time so that a maximum temperature is not exceeded. Those of skill in the art will recognize, however, that whether the aldehyde is added in a single add or is added in a programmed addition will not affect the final polymer product.

As described herein, a phenol-aldehyde polymer is a polymer made from a phenolic compound and an aldehyde. The phenolic compound of the phenol-aldehyde polymer may be the phenolic compounds independent of bisphenolic stillbottoms; or may be bisphenolic stillbottoms free of phenolic compounds independent of bisphenolic stillbottoms. For polymers having both bisphenolic stillbottoms and phenolic compound independent of bisphenolic stillbottoms, the polymer is described as a bisphenolic stillbottoms modified phenol-formaldehyde polymer.

In one embodiment, a lignosulfonate modified phenol-aldehyde polymer is provided. A lignosulfonate modified phenol-aldehyde polymer may have a molar ratio of phenolic compound, such as phenol, to aldehyde, for example, formaldehyde, from about 1.5:1 to about 4.5:1, such as from about 2.5:1 to about 3.5:1, and a molar ratio of lignosulfonate to aldehyde from about 40:1 to about 80:1, such as about 50:1 to about 70:1.

In one embodiment, a lignosulfonate modified phenol-aldehyde polymer may be formed from a condensate comprising:
from about 8 wt. % to about 30 wt. % phenolic compound independent of bisphenolic stillbottoms;
from about 20 wt. % to about 40 wt. % aldehyde;
from about 5 wt. % to about 30 wt. % of lignosulfonate;
from about 2 wt. % to about 12 wt. % of catalyst;
from about 5 wt. % to about 20 wt. % of amino compound; and
from about 40 wt. % to about 60 wt. % of water, wherein the total weight percent (wt. %) is 100%.

In another embodiment, a bisphenolic stillbottoms modified phenol-aldehyde polymer is provided. A bisphenolic stillbottoms modified phenol-aldehyde polymer may have a molar ratio of phenolic compound (from both bisphenolic stillbottoms and phenolic compound independent of bisphenolic stillbottoms) to aldehyde from about 1:1 to about 5:1, such as from about 2:1 to about 4:1, and a molar ratio of bisphenolic stillbottoms to aldehyde from about 1:1 to about 60:1, such as from about 10:1 to about 50:1.

In one embodiment, a bisphenolic stillbottoms modified phenol-aldehyde polymer may be formed from a condensate comprising:
from about 8 wt. % to about 30 wt. % phenolic compound independent of bisphenolic stillbottoms;
from about 20 wt. % to about 40 wt. % aldehyde;
from about 5 wt. % to about 20 wt. % of bisphenol stillbottoms;
from about 5 wt. % to about 12 wt. % of catalyst;
from about 5 wt. % to about 20 wt. % of amino compound; and
from about 40 wt. % to about 60 wt. % of water, wherein the total weight percent (wt. %) is 100%.

Alternatively, a bisphenolic stillbottoms-aldehyde polymer may have a molar ratio of phenolic compound (from bisphenolic stillbottoms only) to aldehyde from about 1:1 to about 5:1, such as from about 2:1 to about 4:1, and a molar ratio of bisphenolic stillbottoms to aldehyde from about 1:1 to about 60:1, such as from about 10:1 to about 50:1.

In one embodiment, a bisphenolic stillbottoms-aldehyde polymer may be formed from a condensate comprising:
from about 20 wt. % to about 40 wt. % aldehyde;
from about 5 wt. % to about 20 wt. % of bisphenol stillbottoms;
from about 5 wt. % to about 12 wt. % of catalyst;
from about 5 wt. % to about 20 wt. % of amino compound; and
from about 40 wt. % to about 65 wt. % of water, wherein the total weight percent (wt. %) is 100%.

In another embodiment, a bisphenolic stillbottoms and lignosulfonate modified phenol-aldehyde polymer is provided. A bisphenolic stillbottoms and lignosulfonate modified phenol-aldehyde polymer may have a molar ratio of phenol to aldehyde from about 1 to about 20, such as from about 5 to about 10, a molar ratio of lignosulfonate to aldehyde from about 1 to about 50, such as from about 5 to about 30, and a molar ratio of bisphenolic stillbottoms to aldehyde from about 1 to about 50, such as from about 5 to about 30. In a further embodiment, where the bisphenolic stillbottoms and lignosulfonate replaces all the phenol in the polymer, a bisphenol-lignosulfonate-formaldehyde polymer may have a molar ratio of lignosulfonate to aldehyde is from about 1 to about 40, such as from about 5 to about 20 and a molar ratio of bisphenolic stillbottoms to aldehyde is from about 1 to about 50, such as from about 5 to about 30.

In one embodiment, a bisphenolic stillbottoms and lignosulfonate modified phenol-aldehyde polymer may be formed from a condensate comprising:
from about 0.5 wt. % to about 15 wt. % phenolic compound independent of bisphenolic stillbottoms;
from about 20 wt. % to about 40 wt. % aldehyde;
from about 5 wt. % to about 20 wt. % of bisphenol stillbottoms;
from about 5 wt. % to about 20 wt. % of lignosulfonate;
from about 5 wt. % to about 12 wt. % of catalyst;
from about 5 wt. % to about 20 wt. % of amino compound; and
from about 40 wt. % to about 60 wt. % of water, wherein the total weight percent (wt. %) is 100%.

In a further embodiment, a polymer composition is formed by combining a lignosulfonate modified phenol-aldehyde polymer with a bisphenolic stillbottoms modified phenol-aldehyde polymer. In such an embodiment, the weight ratio in the resulting polymer of lignosulfonate modified phenol-aldehyde polymer to bisphenolic stillbottoms modified phenol-aldehyde polymer is from about 1:99 to about 99:1, such as from about 10:90 to about 50:50. Further, the resulting polymer may have a molar ratio of phenol to aldehyde from about 1.5:1 to about 4.5:1, such as from about 2.5:1 to about 3.5:1, a molar ratio of lignosulfonate to aldehyde from about 40:1 to about 80:1, such as from about 50:1 to about 70:1, and a molar ratio of bisphenolic stillbottoms to aldehyde from about 1:1 to about 60:1, such as from about 10:1 to about 50:1. In a further embodiment, where the bisphenolic stillbottoms and lignosulfonate replaces all the phenol in the polymer, a resulting bisphenol-lignosulfonate-formaldehyde polymer may have a molar ratio of lignosulfonate to aldehyde is from about 1:1 to about 50:1, such as from about 5:1 to about 30:1 and a molar ratio of bisphenolic stillbottoms to aldehyde is from about 1:1 to about 40:1, such as from about 5:1 to about 30:1.

EXAMPLES

The following examples serve to illustrate embodiments of the present invention.

Example 1

Stable Solution Preparation

Part A: A 90% aqueous solution of bisphenolic stillbottoms, based on the total solution weight, was prepared as follows. In this example, the atmosphere in the reactor was air, however, other atmospheres, such as nitrogen, may be used. To a reactor fitted with a means for mixing and a means for reflux, PHENOLIC EXTENDER V-390 ("V-390") was added. The V-390 was heated from ambient room temperature to 125° C. (257° F.) over a period of 55 minutes, under mixing. At a temperature of 95-125° C. (203-257° F.) V-390 is molten. Although not considered critical to the methods of the present invention, the molten V-390 was mixed for 5 minutes. After mixing the molten V-390 for five minutes, water was added to the reactor in an amount that was 10%, on a weight basis, of the combined weight of the V-390 and the water. The temperature of the water at the time of addition was nominally 25° C. (77° F.) and the water was not heated prior to adding it to the reactor, although this is not considered a controlling variable. Mixing was maintained during and after the addition of the water. The water immediately began to boil and the temperature of the reactor contents rapidly dropped to 100° C. (212° F.). With mixing, and during the first 20 minutes following the addition of the water, the V-390 and the water maintained separate phases. After about 60 minutes, the temperature of the reactor contents had decreased to about 95° C. (203° F.), under reflux, and the reactor contents now appeared clear and homogeneous.

Part B: Alternatively, it has been determined that water may be metered into molten bisphenolic stillbottoms, in a programmed manner, to make the stable aqueous solutions of the present invention. In this example water in an amount equal to 10% of the combined weight of water and bisphenolic stillbottoms was added to molten V-390. In this example, a reactor fitted with a means for mixing and a means for determining temperature was used. An atmosphere of air was maintained in the reactor. Initially, V-390 was added to a reactor and brought to a temperature of 115° C. (239° F.) and allowed to melt under mixing. Although not considered critical to the methods of the present invention, the V-390 was allowed to mix for about 15 minutes. Water was then added in the amount described above over a 38 minute period under reflux. At the end of the 38 minute period the temperature of the reactor contents at decreased to about 100° C. (212° F.). At the end of 38 minute period of water addition, the reactor contents were mixed for an additional 47 minutes at 100° C. (212° F.). It was observed that by using the above-described programmed addition no cold gelling of the V-390 occurred upon addition of the water and there was no flooding of the reflux condenser.

Inefficiencies in the operation of the condenser can explain loss of water during the mixing of water and bisphenolic stillbottoms at reflux temperatures.

For the following Examples, resultant data was determined as follows:

Molecular weight was determined by gel permeation chromatography using ammonium formate (15 mM) buffered DMSO as the mobile phase 1 mL/min. GPC columns are Agilent PLGel 5 μm Mixed D 7.5×300 mm at 80° C. using a UV detector at 285 nm.

Alkalinity (total alkali assay) in the polymers was determined by the milliliters of standard acid required to shift a polymer to the pH to 3.0, and from this value the percent total alkali as Sodium Hydroxide may be expressed. Phenol/formaldehyde polymers contain alkali, which keeps the polymer in a liquid state. As the pH of a polymer is lowered, with standard acid, the free alkali is consumed first. Thereafter, the neutralization reaction is of the sodium salt of the polymer. This portion of the reaction is characterized by the precipitation of the polymer, which is no longer able to remain in solution. All of the alkali is neutralized when pH 3.0 is reached. The milliliters of standard acid required to shift the pH to 3.0 are determined. From this value the percent total alkali as Sodium Hydroxide may be expressed.

Calculation:

$$\frac{(A)(N)(40.01)}{(1000)(S.W.)} \times 100 = \% \text{ Total Alkali}$$

Where:
A=mLs required to titrate to pH 3.0
N=Normality of standard acid
S.W.=Sample weight Viscosity was determined using the well-known Brookfield viscometer. The Brookfield viscometer measures the viscous resistance to a rotating spindle immersed in a fluid. The torque necessary to rotate the spindle in the fluid is expressed in centipoise. For the results provided below, a Brookfield Digital Viscometer Model RVF was used. Viscosities were determined at a temperature of 25° C. and the Brookfield Viscometer were maintained at about this temperature using a circulating constant temperature bath.

The gel time of a liquid polymer is the length of time, typically expressed in minutes, required for a polymer to become infusible at a given standard temperature. For this test, a Sunshine Gel Time Meter, catalog number 22 available from Sunshine Scientific Instrument Inc., Philadelphia, Pa., is used to measure the end point of the gel time. In this method, a constant boiling temperature solvent, deionized water, is used. For gel time measurements reported below, tetrachloroethylene (perchloroethylene) was used, which has a constant boiling temperature of 100° C. Accordingly, the gel times reported below were determined at 100° C. The Sunshine Gel Time Meter will automatically identify the end point of the gel time.

Examples 2 and 3 are illustrated based on 2000 g of total material, however, the process can be scaled for any amount of material from a small lab scale to commercial production quantities.

Example 2

Bisphenolic Stillbottoms-Lignosulfonate-Phenol-Aldehyde Polymer

To a reactor, as described earlier, 151.9 g of phenol, 208.8 g of bisphenolic stillbottoms composition (90% aqueous solution), 229 g of 48% solids sodium lignosulfonate solution, 200 g of 50% aqueous sodium hydroxide, and 172.6 g of water were added to form a reaction mixture. These components were heated to about 50° C., under mixing and at vacuum. Next, 730.8 g of aqueous 52% formaldehyde solution was metered into the reaction mixture over a 30 minute period. The temperature of the reaction mixture was held at about 70° C. and allowed to react under mixing for about 30 minutes. The reaction was then allowed to continue until a reaction mixture temperature of 80° C. and by a condensation reaction mechanism achieve a viscosity of about 93 cps (Gardner scale "C/D"). The reaction mixture was then cooled to 70° C. and further condensation reacted achieve a viscosity of about 165 cps (Gardner scale "G"). The condensation reaction was continued at a temperature of 67° C. while charging 34.9 g of phenol until a viscosity of about 627 cps (Gardner scale "U") was achieved. The reaction mixture was cooled to 25° C. and 200 g urea was added to the reaction mixture.

The polymer thus prepared was a bisphenolic stillbottoms-lignosulfonate-phenol-aldehyde polymer sodium salt (acetone-phenol reaction products-lignosulfonate-formaldehyde-phenol polymer sodium salts) having a phenol to formaldehyde molar ratio of 6.37:1, bisphenolic stillbottoms to formaldehyde molar ratio of 11.43:1, a lignosulfonate to formaldehyde molar ratio of 61.54:1, a molecular weight (Mw) of about 1525, an alkalinity of about 5%, a gel time of 26 minutes, and a viscosity of 250 cps.

For a percentage based process of components, the above reaction can be represented as follows in Table 2:

TABLE 2

| Component | Quantity (wt %) |
|---|---|
| Initial Phenol (100%) addition | 7.595 |
| Sodium lignosulfonate (48% solids) | 11.45 |
| bisphenolic stillbottoms (90% aqueous solution) | 14.04 |
| Water | 8.63 |
| Sodium hydroxide (50% solution) | 10 |
| Formaldehyde (52% solution) | 36.54 |
| Second Phenol (100%) addition | 1.747 |
| Urea | 12 |
| Total components | 100 |

Example 3

Bisphenolic Stillbottoms-Lignosulfonate-Formaldehyde Polymer in the Absence of a Separate Phenolic Compound To a reactor, as described earlier, 343.6 g of bisphenolic stillbottoms composition (90% Aqueous solution), 500.5 g of 48% solids sodium lignosulfonate solution, 100 g of 50% aqueous sodium hydroxide, and 70 g of water were added to form a reaction mixture. These components were heated to about 50° C., under mixing and at vacuum. Next, 340 g of aqueous 52% formaldehyde solution was metered into the reaction mixture over a 30 minute period with 40 g of 50% aqueous sodium hydroxide. The temperature of the reaction mixture was held at about 70° C. and allowed to react under mixing for about 30 minutes. The reaction was then allowed to continue until a reaction mixture temperature of 77° C. and by a condensation reaction mechanism achieve a viscosity of about 385 cps (Gardner scale "O/P"). The reaction mixture was then cooled to 70° C., 300 g of aqueous 52% formaldehyde solution was changed to the reaction mixture, 66 g of 45.5% aqueous potassium hydroxide was added to the reaction mixture, and further condensation reacted achieved a viscosity of about 300 cps (Gardner scale "L"). The condensation reaction was continued at a temperature of 66° C. until a viscosity of about 627 cps (Gardner scale "U") was achieved. The reaction mixture was cooled to 25° C. and 240 g urea was added to the reaction mixture.

The polymer thus prepared was a bisphenolic stillbottoms-lignosulfonate-formaldehyde polymer sodium salt (acetone-phenol reaction products-lignosulfonate-formaldehyde-polymer sodium salts) having bisphenolic stillbottoms to formaldehyde molar ratio of 8.18, a lignosulfonate to formaldehyde molar ratio of 24.66:1, a molecular weight (Mw) of about 1634, an alkalinity of about 4.56%, a gel time of 26 minutes, and a viscosity of 310 cps.

For a percentage based process of components, the above reaction can be represented as follows in Table 3:

TABLE 3

| Component | Quantity (wt %) |
|---|---|
| bisphenolic stillbottoms (90% aqueous solution) | 17.18 |
| Sodium lignosulfonate (48% solids) | 25.025 |
| Water | 3.495 |
| Sodium hydroxide (50% solution) | 5 |
| Formaldehyde (52% solution) | 17 |
| Second Sodium hydroxide (50% solution) addition | 2 |
| Second Formaldehyde (52% solution) addition | 15 |
| Potassium hydroxide (45.5% solution) | 3.3 |
| Urea | 10 |
| Total components | 100 |

Applications of the Compositions of the Present Invention

The polymers of the present invention are useful in, but not limited to, a broad range of composite manufacturing processes. For example, the polymers of the present invention may be used in conventional composite processes, such as used for the manufacture of oriented strand board. The polymers of the present invention may also be used in the preparation of laminates and may be used in the preparation of saturated, or partially saturated, paper products, such as filter paper.

In one embodiment, the polymers described herein were used for forming an oriented strand board (OSB). OSB is an engineered wood particle board formed by layering strands (flakes) of wood in specific orientations. In one embodiment, OSB may have a rough and variegated surface with the individual strips of around 2.5×15 cm (1"×6"), lying unevenly across each other. OSB is a material with high mechanical properties that make it particularly suitable for load-bearing applications in construction. The most common uses for OSB are as sheathing in walls, flooring, and roof decking. For exterior wall applications, panels are available with a radiant-barrier layer pre-laminated to one side; this eases installation and increases energy performance of the building envelope. OSB also sees some use in furniture production.

The polymers in the Examples above were processes in manufacturing oriented strand board (OSB) panels. Laboratory OSB panels were formed under the following controlled parameters. OSB strands (southern yellow pine) were obtained from an OSB plant. The strands were dried to 5.0% moisture content and weighted into 6,000 g batches, one batch for each phenolic base polymer condition. In this study phenolic polymers were only used in the surface layers, the core layer were polymeric methylene diphenyl diisocyanate (pMDI) polymer. Wax emulsion and phenolic polymers were added to each batch using a Coil Manufacturing blending system. The wax emulsion was applied using a pump, spray nozzle, and steam. The strands were treated with 1.0% wax solids by weight. The phenolic base polymers were applied using a pump and atomizer, spinning around 10,000 RPMs. The strands were treated with 3.0% phenolic polymer solids by weight. The core strands were dried to a moisture content of 5.0% and batched into two 10,000 g batches. Wax emulsion was applied using the same method and at a treatment level of 1.0% wax solids by weight. pMDI Polymer was also applied using the same method but at a treatment level of 1.9% polymer solids by weight.

Each OSB panel was manually formed under the following parameters. Target board density was 42 lb/ft$^2$, thickness of 0.4375 in, and surface layer to core layer ratio of 60:40. These parameters calculated 411 g of phenolic polymer treated strands for each surface layer and 548 g of pMDI polymer treated strands for the core layer. The Panels were manually oriented in a 17 in×17 in forming box.

Each OSB panel was hot pressed, in an Erie Mill Press, under the following parameters. The hot press platen temperatures were 425° F. The panel's cycle was 45 sec time to position at a 0.4375 in thickness. The panel cook time was 110 sec at position and a 15 sec degas at a thickness of 0.4525 in. Each panel was sawed into a 14 in by 14 in finished panel and hot stacked for 16 hours. Panels were allowed to come to equilibrium for 24 hours before testing.

Each panel was tested with Automated Bond Evaluation System (ABES) operating parameters, by the following process. The ABES apparatus has a Grip force and Max Pull force pressure set between 90-100 psi. The platen supporting the Maple veneer was heated to 110° C. The Maple veneer panel was cut to the dimensions of 4.625 inches in length by 0.75 inches in width. The Maple veneer sections were placed in an oven at 80° C. for 30 minutes and then set to cool for 30 minutes. Polymers were applied to 0.125 inch of the veneer at a treatment of 13 milligram (mg)+/−1 mg to one side. A treated Maple veneer section and an untreated Maple veneer section were placed in the instrument a pressed at different cook times (30, 60, 90, 120 sec), and pulled apart. The pull force was calculated in Newtons. Each cook time was repeated 3 times and the results averaged. The results for comparison data are shown in Table 4 below.

Two polymers were prepared, tested, as above, and the results were shown below. The two polymers are a control polymer and a bisphenolic stillbottoms-lignosulfonate-formaldehyde polymer.

The Control Polymer is a bisphenolic stillbottoms-phenol-formaldehyde polymer comprising a mixture of the polymers of Cascophen™ TC-52B-P39 polymer, a bisphenol-phenol-formaldehyde polymer, and Cascophen™ DL11-23.2 (CAS No. 1065544-88-8), a bisphenolic stillbottoms phenol-formaldehyde polymer, at a 75:25 weight percent ratio. Cascophen™ TC-52B-P39 polymer is a 39% phenol replacement by bisphenolic stillbottoms and Cascophen™ DL11-23.2 is a 20% phenol replacement by bisphenolic stillbottoms. Both polymers are free of lignosulfonate. This polymer is also described as Polymer 3 (Control) below.

The second polymer is a bisphenolic stillbottoms-lignosulfonate-formaldehyde polymer comprising a mixture of the polymers of Example 3 and Cascophen™ DL11-23.2 polymer (CAS No. 1065544-88-8), a bisphenolic stillbottoms phenol-formaldehyde polymer, at a 75:25 weight percent ratio. Example 3 is a 100% replacement of phenol by both bisphenolic stillbottoms and lignosulfonate.

TABLE 4

| Control Polymer | | Bisphenolic Stillbottoms-Lignosulfonate-Formaldehyde Polymer | |
|---|---|---|---|
| Time (seconds) | Force (Newtons) | Sec | Force (N) |
| 30 | 72.81 | 30 | 70.09 |
| 60 | 142.21 | 60 | 141.53 |
| 90 | 178.13 | 90 | 179.81 |
| 120 | 238.01 | 120 | 236.55 |

The ABES results show that the pull force of the novel polymer of bisphenolic stillbottoms-lignosulfonate-formaldehyde polymer in the absence of a separate phenolic compound is very comparable in bond performance as the current marketed product of a bisphenol-stillbottoms modified phenol-aldehyde polymer.

For the following examples, resultant data was determined as follows:

Internal Bond Density was measured by the following calculation. Board Density=(Weight(g)/Thickness(in))*(3.81/Area of Board(in$^2$)).

Thickness Swell and Water Absorption was measured by the following process. Six boards with the dimension of 6 inch×6 inch squares were tested by recording the initial weight of the board ($Wt_{Initial}$), measuring the thickness around all four sides (1 in into the board) and average the thickness results ($TSavg_{Initial}$), and then soaking the boards in a circulating water bath for 24 hours at 20° C. Next, the boards are removed and allowed to drain water for 15 minutes. The final weight ($Wt_{Final}$) of the boards is recorded and the final thickness ($TSavg_{Final}$) are measured as for the initial thickness. The final results of the weights and thicknesses are averaged. The Thickness Swell and Water Absorption are then calculated as follows:

Water Absorption=[($Wt_{Final}$−$Wt_{Initial}$)/$Wt_{Final}$]*100

Thickness swelling=[($TSavg_{Final}$−$TSavg_{Initial}$)/$TSavg_{Final}$]*100.

Internal Bond was measured by was measured by detecting a pull force load in psi and dividing that value by the sample area.

The OSB panels were obtained and tested with the results as follows.

TABLE 5

| Polymer | Density | Thickness Swell | Water Absorption | Internal Bond Density | Internal Bond |
|---|---|---|---|---|---|
| Polymer 1-Control | 41.90 | 20.69% | 37.22% | 41.52 | 52.47 |
| Polymer 2 | 41.87 | 19.71% | 37.66% | 41.40 | 56.49 |
| Polymer 3-Control | 41.92 | 20.41% | 35.53% | 41.44 | 51.04 |
| Polymer 4 | 41.87 | 19.36% | 36.15% | 41.57 | 57.58 |
| Polymer 5 | 41.90 | 17.63% | 35.03% | 41.67 | 54.07 |
| Polymer 6 | 41.89 | 23.07% | 41.59% | 41.61 | 57.16 |

Polymer 1 is phenol-formaldehyde polymer comprising a mixture of the polymers of Cascophen™ TC-52B polymer (CAS No. 40798-65-0), a phenol-formaldehyde polymer, and Cascophen™ DL11-23 polymer (CAS No. 40798-65-0), a phenol-formaldehyde polymer, at a 75:25 weight percent ratio. Both polymers are free of both lignosulfonate and bisphenolic stillbottoms. Both polymers are commercially available from Hexion Inc. of Columbus, Ohio.

Polymer 2 is lignosulfonate-phenol-formaldehyde polymer comprising a mixture of the polymers of Cascophen™ TC-52B-N20 polymer (CAS No. 37207-89-9), a lignosulfonate-phenol-formaldehyde polymer, and Cascophen™ DL11-23 polymer (CAS No. 40798-65-0) at a 75:25 weight percent ratio. Cascophen™ TC-52B-N20 polymer is a 20% phenol replacement by lignosulfonate, creating a lignosulfonate polymer with phenol, formaldehyde, and sodium salts.

Polymer 3 is a bisphenolic stillbottoms-phenol-formaldehyde polymer comprising a mixture of the polymers of Cascophen™ TC-52B-P39 polymer, a bisphenol-phenol-formaldehyde polymer, and Cascophen™ DL11-23.2 (CAS No. 1065544-88-8), a bisphenolic stillbottoms phenol-formaldehyde polymer, at a 75:25 weight percent ratio. Cascophen™ TC-52B-P39 polymer is a 39% phenol replacement by bisphenolic stillbottoms and Cascophen™ DL11-23.2 is a 20% phenol replacement by bisphenolic stillbottoms. Both polymers are free of lignosulfonate.

Polymer 4 is a bisphenolic stillbottoms-lignosulfonate-phenol-formaldehyde polymer comprising a mixture of the polymers of Cascophen™ TC-52B-N20 polymer (CAS No. 37207-89-9), a lignosulfonate-phenol-formaldehyde polymer, and Cascophen™ DL11-23.2 (CAS No. 1065544-88-8), a bisphenolic stillbottoms phenol-formaldehyde polymer at a 75:25 weight percent ratio. This is a blend of a lignosulfonate-phenol-formaldehyde polymer and a bisphenolic stillbottoms-phenol-formaldehyde polymer.

Polymer 5 is a bisphenolic stillbottoms-lignosulfonate-phenol-formaldehyde polymer comprising a mixture of the polymers of Example 2 and Cascophen™ DL11-23.2 polymer (CAS No. 1065544-88-8), a bisphenolic stillbottoms phenol-formaldehyde polymer, at a 75:25 weight percent ratio. Example 2 is a 66% phenol replacement by both bisphenolic stillbottoms and lignosulfonate.

Finally, Polymer 6 is a bisphenolic stillbottoms-lignosulfonate-formaldehyde polymer comprising a mixture of the polymers of Example 3 and Cascophen™ DL11-23.2 polymer (CAS No. 1065544-88-8), a bisphenolic stillbottoms phenol-formaldehyde polymer, at a 75:25 weight percent ratio. Example 3 is a 100% replacement of phenol by both bisphenolic stillbottoms and lignosulfonate.

The Panel results shown in Table 5 that the thickness swell, water absorption, and internal bond of the novel polymers (phenol-formaldehyde polymer and bisphenolic stillbottoms, phenol-formaldehyde polymer and blend of the lignosulfonate phenol-formaldehyde and bisphenolic stillbottoms, phenol-formaldehyde Polymer) to be very comparable in bond performance and water properties as the current commercial phenol formaldehyde polymers as shown in control Polymers 1 and 3. The novel polymers have the same performance in panel properties with a huge reduction in the amount of phenol.

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

What is claimed is:

1. A polymer comprising:
    a condensate comprising:
        from about 1 wt. % to about 20 wt. % of bisphenolic stillbottoms;
        an optional phenolic compound independent of bisphenolic stillbottoms;
        from about 10 wt. % to about 40 wt. % an aldehyde;
        from about 5 wt. % to about 20 wt. % of a lignosulfonate compound;
        from about 5 wt. % to about 12 wt % of catalyst;
        from about 5 wt. % to about 20 wt. % of amino compound; and
        from about 40 wt. % to about 60 wt. % of water,
            wherein the total weight percent (wt. %) is 100%.

2. The polymer of claim 1, wherein the bisphenolic stillbottoms comprise a single-phase bisphenolic stillbottoms composition comprising:
    bisphenolic stillbottoms in an amount from about 99% to about 85% based on the weight of the composition; and
    a solvent in an amount from about 1% to about 15% based on the weight of the composition.

3. The polymer of claim 2 wherein the solvent is water or an organic solvent.

4. The polymer of claim 1, wherein the bisphenolic stillbottoms comprise:
    10 wt. % to 84 wt. % of p,p-Bisphenol A;
    0 wt. % to 30 wt. % of o,p-Bisphenol A;
    10 wt. % to 25 wt. % of trisphenol;
    0 wt. % to 30 wt. % Chroman-I (p-(2,2,4-trimethyl-4-chromanyl)phenol);
    0 wt % to 25 wt. % of phenol; and
    45 wt. % to 75 wt. % of other phenol-acetone reaction products.

5. The polymer of claim 1, wherein the phenolic compound independent of bisphenolic stillbottoms is selected from the group consisting of phenol, cresol, xylenol, alkyl substituted phenol, bisphenol A, bisphenol F, and combinations thereof.

6. The polymer of claim 5, wherein the phenolic compound independent of bisphenolic stillbottoms composition comprises at least 90% phenol.

7. The polymer of claim 1, wherein the aldehyde is selected from the group consisting of formaldehyde, acetaldehyde, propionaldehyde, n-butyraldehyde, isobutyraldehyde, benzaldehyde, glyoxal, furfural, glyoxal, glutaraldehyde, and combinations thereof.

8. The polymer of claim 1, wherein the condensate further comprises an organic solvent.

9. The polymer of claim 1, wherein the lignosulfonate compound comprises a compound selected from the group consisting of lignosulfonic acid sodium salt, lignosulfonic acid ammonium salt, lignosulfonic acid potassium salt, lignosulfonic acid calcium salt, and combinations thereof.

10. The polymer of claim 1, wherein the condensate is free of the phenolic compound independent of bisphenolic stillbottoms.

11. The polymer of claim 1, wherein the condensate comprises:
    from about 0.5 wt. % to about 15 wt. % phenolic compound independent of bisphenolic stillbottoms,
        wherein the total weight percent (wt. %) is 100%.

12. The polymer of claim 1, wherein the bisphenolic stillbottoms is derived from a bisphenol A process, the bisphenolic stillbottoms is derived from a bisphenol F process, and combinations thereof.

13. A method of making a polymer, the method comprising:
   mixing and reacting:
   from about 10 wt. % to about 40 wt. % of an aldehyde,
   from about 5 wt. % to about 20 wt. % of a lignosulfonate compound, and
   from about 1 wt. % to about 20 wt. % of bisphenolic stillbottoms;
   from about 5 wt. % to about 12 wt. % of catalyst;
   from about 5 wt. % to about 20 wt. % of amino compound; and
   from about 40 wt. % to about 60 wt. % of water, wherein the total weight percent (wt. %) is 100%.

14. The method of claim 13, further comprising adding a phenolic compound independent of bisphenolic stillbottoms.

15. The method of claim 13, wherein the mixing and reacting comprises:
   at least mixing bisphenolic stillbottoms and a lignosulfonate compound to produce a reaction product;
   adding at least an aldehyde to the reaction product; and
   mixing and reacting the reaction product and the at least an aldehyde.

16. The method of claim 13, wherein the bisphenolic stillbottoms is derived from a bisphenol A process, the bisphenolic stillbottoms is derived from a bisphenol F process, and combinations thereof.

* * * * *